(12) United States Patent
Skjelten et al.

(10) Patent No.: US 8,009,191 B2
(45) Date of Patent: Aug. 30, 2011

(54) INTEGRATED MARINE SEARCH SYSTEM

(75) Inventors: Hákon Skjelten, Trondheim (NO);
Jonas Aamodt Moræus, Trondheim (NO); Lars André Solberg, Trondheim (NO)

(73) Assignee: Aptomar AS, Trondheim (NO)

( * ) Notice: Subject to any disclaimer, the term of this patent is extended or adjusted under 35 U.S.C. 154(b) by 838 days.

(21) Appl. No.: 12/076,228

(22) Filed: Mar. 14, 2008

(65) Prior Publication Data
US 2009/0096867 A1 Apr. 16, 2009

(30) Foreign Application Priority Data
Oct. 11, 2007 (NO) .................................... 20075187

(51) Int. Cl.
*H04N 7/18* (2006.01)
*G06F 15/16* (2006.01)
(52) U.S. Cl. ...................................................... 348/113
(58) Field of Classification Search ........... 348/113–118
See application file for complete search history.

(56) References Cited

U.S. PATENT DOCUMENTS

| | | | | |
|---|---|---|---|---|
| 4,536,770 A | * | 8/1985 | Allen et al. ...................... | 346/29 |
| 4,939,661 A | * | 7/1990 | Barker et al. ................. | 701/200 |
| 5,268,844 A | * | 12/1993 | Carver et al. ................. | 701/200 |
| 5,404,648 A | * | 4/1995 | Taylor, Jr. ....................... | 33/431 |
| 7,973,705 B2 | * | 7/2011 | Cunning et al. .............. | 342/176 |
| 2006/0290562 A1 | | 12/2006 | Ehresman | |

FOREIGN PATENT DOCUMENTS

| | | |
|---|---|---|
| GB | 2 441 802 A | 3/2008 |
| WO | WO 2006/035305 A2 | 4/2006 |
| WO | WO-2007/030018 A1 | 3/2007 |

OTHER PUBLICATIONS

Rhodes et al., "SeeCoast: Persistent Surveillance and Automated Scene Understanding for Ports and Coastal Areas," Proc. of SPIE, Defense Transformation and Net-Centric Systems, vol. 6578, XP 40240752, 2007.
Ruiz et al., "A Short-Range Ship Navigation System Based on Ladar Imaging and Target Tracking for Improved Safety and Efficiency," IEEE Transactions on Intelligent Transportation Systems, vol. 10, No. 1, pp. 186-197, XP 11250412, Mar. 2009.

* cited by examiner

*Primary Examiner* — Zarni Maung
(74) *Attorney, Agent, or Firm* — Birch, Stewart, Kolasch & Birch, LLP

(57) ABSTRACT

The invention relates to a marine recovery system comprising the following features:
a chart plotter (1)
a position sensor (10) arranged for displaying the vessel's (2) position (2N, 2E) in said chart plotter (1);
a position receiver (21) for other vessels' (22$_1$, 22$_2$, . . . ) or objects (24) position (23N, 23E) and possibly their identity, and for displaying them in said chart section (4);
an pointing camera unit (3) for directing a stabilized main axis (31) towards a target (5) in or by the sea, and arranged for calculating the target's position (5N, 5E),
a camera image (45) for being displayed in said chart plotter (1) with an aiming circle (55) representing said stabilized main axis (31), and for moving said camera image (45) to a new desired position (53N, 53E) in said chart section (4);
an identification unit (7) connected to the pointing unit (3) arranged to select and assign to said target (5) a class (51) and for storing said assigned class (51) and said target's (5) position (53N, 53E) as an object (24) with a stored position (58N, 58E) in a second memory (82) for display as symbols (22$s$) in said chart plotter (1).

18 Claims, 3 Drawing Sheets

INTEGRATED MARINE SEARCH SYSTEM

The present invention relates to a marine search and recovery system with a nautical chart plotter arranged for displaying a vessel and its heading in a selected part of a nautical chart, and also for displaying other vessels or objects.

BACKGROUND ART AND RELATED PROBLEMS

During marine operations, electronic naval chart plotters are usually used for displaying a naval chart on a screen, in true or relative course projection. The vessel usually also has a position calculating unit such as a global positioning system (GPS) sending signals to the chart plotter so as for enabling the chart plotter unit to compute an appropriate section of the chart in a desired scale. It is further common usage to display the vessel itself generally centrally in the consecutively projected chart section as a boat-shaped symbol with the vessel's course track and heading indicated. Most civilian vessels above a given tonnage are furnished with an automatic identification system (AIS) broadcasting the vessel's position and identification signal. Such broadcasted AIS-information when received by an AIS-receiver may also be forwarded to a chart plotter and display such civilian vessels as symbols in their relevant positions on the chart plotter.

The applicants have previously disclosed a stabilized searchlight which is connected to acceleration sensors and arranged for keeping the light cone fixed on an object in an arbitrarily selected position at the sea surface. During the stabilizing process the object's position is calculated and registered. This may be useful from a safety-at-sea point of view so as for ensuring that a found object is not lost out of sight and, if possibly, reported to other vessels that may take over handling the object whether it has a correspondingly working searchlight or not.

However, it is desirable to have more than one local searchlight on one single vessel. A searchlight may provide much information as such but there is a strong need for collecting such information in a way that enables acquisition and mutual distribution to several participating parts in a marine search operation, such as in routinely conducted operations as search for instrument buoys, mooring devices, flotsam or oil slicks, but also for more critical search and rescue operations for finding a vessel, a life raft or lifeboat, and not the least a search for one or more men overboard. In such situations it is highly desirable that all available vessels being capable of constructively contributing to the rescue operation arrive at the search area as soon as possible and that they are efficiently directed. It is common practice to conduct visual observation and radar search, but it is not widespread practice to share information in other ways than by oral or other radio communication. The applicants are at the time of filing not aware of systems that may meet the demand for coordinating the information exchange during search operations and for distributing the information in a way that may contribute to facilitate the coordination of localizing objects in the sea, or for finding a missing object in the sea in a coordinated and expedite way.

SHORT SUMMARY OF THE INVENTION

The present invention contributes to a solution to the above-mentioned problem. The invention is a marine search system comprising the following features:
- a chart plotter for displaying a desired section of a chart from a chart representation in a first memory;
- a vessel position sensor arranged for transmitting the vessel's position to the chart plotter said chart plotter being arranged for projecting a symbol for the vessel's position and heading in said chart section;
- a position receiver arranged for receiving other vessels' or objects' position and possibly their identifications, of which the chart plotter is arranged for projecting symbols for said vessels or objects in said chart section. Further features of the search system according to the invention comprise:
- a pointing unit arranged for directing a stabilized main axis towards a target in the vicinity of the vessel and arranged for calculating said target's position and being provided with a memory for storing said position;
- said pointing unit comprising one or more cameras arranged for transmitting a camera image for being displayed on said chart plotter with an aiming circle representing said main axis,
- wherein said chart plotter is arranged for displaying a camera chart pointer symbol in the position representing said main axis' intersection with the surface, and a camera command device for moving said camera chart pointer symbol to a new desired position in the chart section and thus command the steering of said main axis towards said new desired position,
- in which said chart plotter's camera image is arranged for displaying an image pointer symbol for a camera image steering device, in which a change of the position of said image pointer symbol contributes to commanding the rotation of said main axis towards a new position for main axis' intersection with the surface;
- an identification unit connected to said pointing unit arranged for on the basis of said camera image to select and assign to said target a class, and further for storing said target's class and position as a stored position in a second memory for display with symbols in said chart plotter.

SHORT FIGURE CAPTIONS

FIG. 1 illustrates a marine recovery system according to the invention with a chart plotter further arranged for displaying a camera image provided from a camera in a pointing unit on the vessel, in which the camera may be controlled by means of a camera control device being logically connected to the chart plotter, and in which the camera also may be controlled using an image pointer system in the image, and where observed objects such as vessels, persons and flotsam may be assigned to a class and displayed as a function of their positions in the chart plot and in the camera image.

DESCRIPTION EMBODIMENTS OF THE INVENTION

The invention may thus broadly be described as comprising a marine recovery system comprising a map plotter further arranged for displaying a camera image (45) given by a camera arranged in a pointing unit (3) on the vessel. A deck unit of the background art marketed as "Securus" by the applicant may comprise the camera. The pointing unit (3) may in a preferred embodiment further comprise a searchlight (54). The camera (52) may be an ordinary video camera, an infrared video camera, or possibly an amplified night vision camera. The pointing unit (3) which is employed in the present invention is arranged for providing direction parameters for calculating the target's (5) position (5N, 5E) based on the vessel's position (2N, 2E) and heading (2A) and position (roll, pitch, yaw) in the water.

Figure 1:
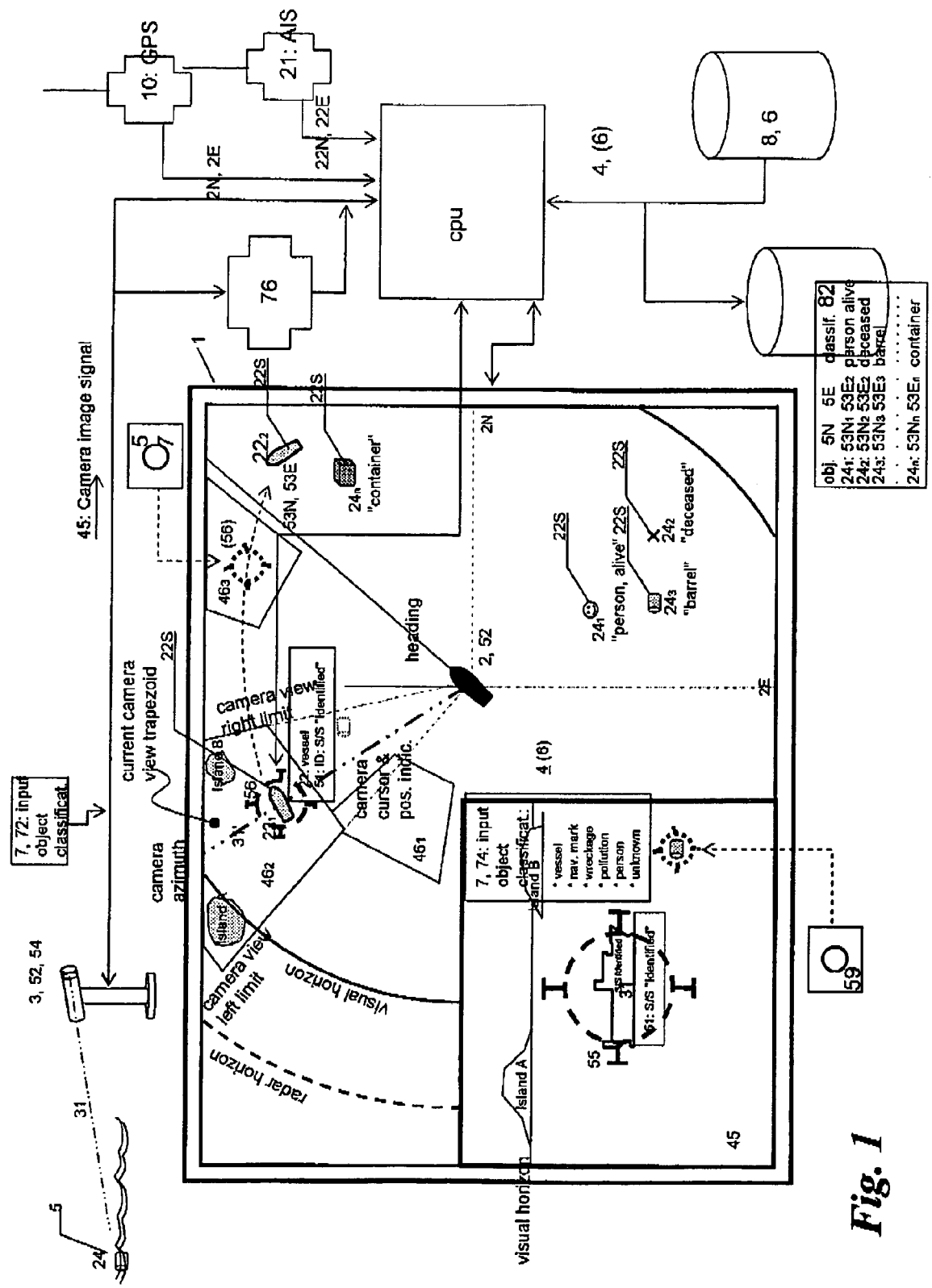
Figure 2:
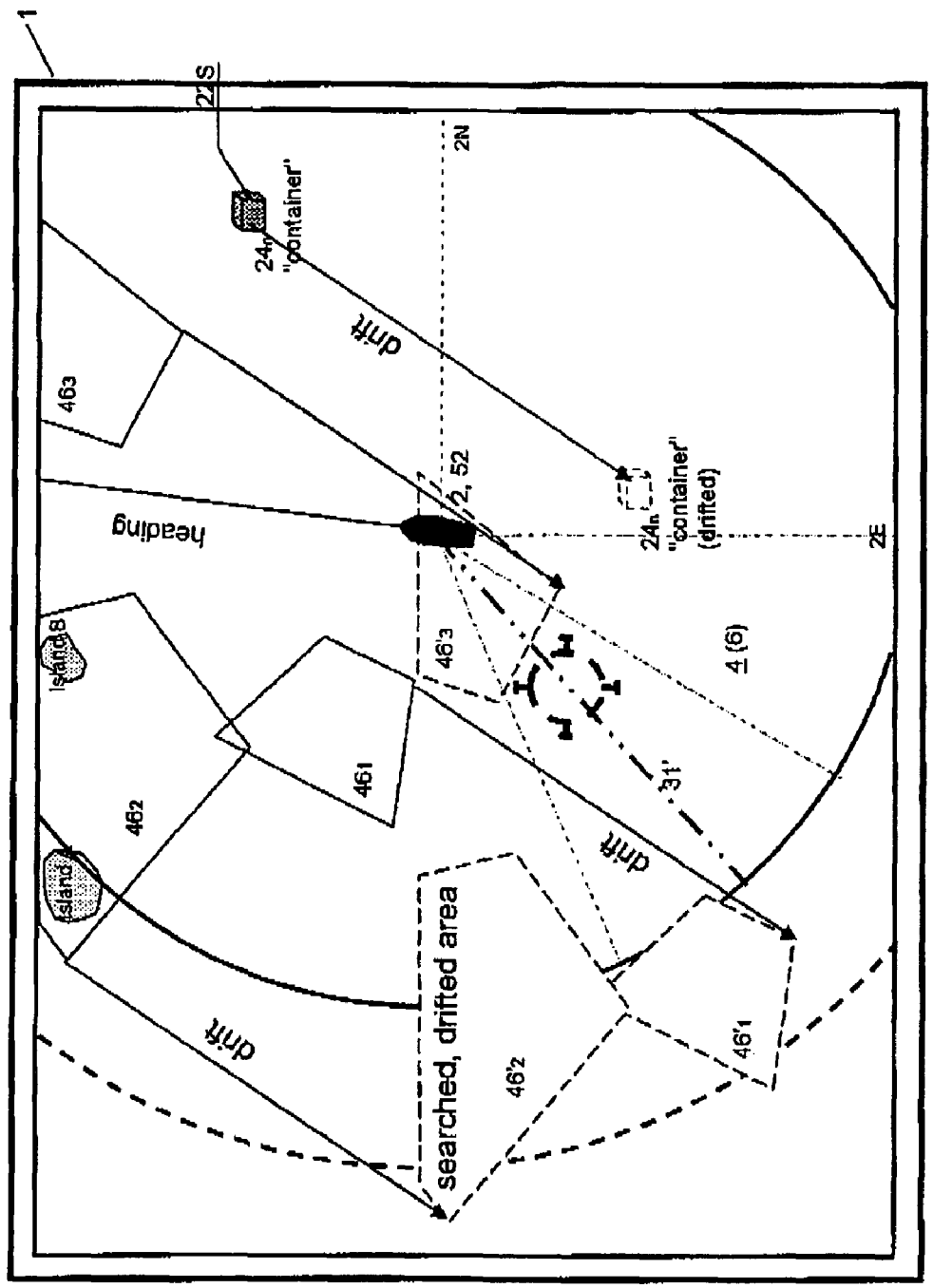
FIG. 2 illustrates observed or calculated deviation of identified freely drifting objects. Further is illustrated an assumed deviatory motion of searched, trapezoidal-shaped areas which have been searched by using the camera.

The camera (52) is in the system arranged for being controlled in two ways: in a first mode it is arranged for being controlled using a camera command device (57) logically connected to the chart plotter (1). The camera (52) is in a second mode arranged for being controlled using an image pointer symbol in the image. Observed objects such as vessels, persons and flotsam may be assigned to a class and displayed by their positions in the chart plot (1) and in the camera image (45). The classification may take place visually using the camera (52) or automatically by image recognition, or by other information such as AIS information in conjunction with the camera axis position. The chart plotter (1) may also in the usual way be arranged to project a radar image across the map section such as shown in FIG. 1.

The camera (52) is in an embodiment arranged such that the camera image (45) is continuously stored in the second memory (82) such that it may, if desired, be retrieved for later display, e.g. as a documentation in a maritime court of inquiry, or if one later in a recovery operation should doubt the veracity of the observations at a given point in time or at a given position.

In additional detail, the marine search system according to the invention comprises the following features:
A chart plotter (1) arranged in the usual manner for displaying a desired chart section (4) from a chart representation (6) in a first memory (8). A position sensor (10), e.g. a GPS, arranged on the vessel (2) arranged for calculating the position (2N, 2E) of the vessel (2) and for sending the position to the chart plotter (1). The chart plotter (1) is arranged in an ordinary manner to project at least one symbol (2s) representing the vessel's position (2N, 2E) and preferably the vessel's heading (2A) in the chart section (4). The position sensor (10) may be a GPS or an integrating so-called motion reference unit (MRU) or an inertial motion unit (IMU). Most vessels above a certain tonnage are equipped with a transmitter for its own position and identification of the vessel. The most common among such system is a so-called automatic identification system, abbreviated AIS, but some radars may also be arranged for coding the vessel's own identification into its own emitted radar signal. Also buoys and other objects may be provided with AIS. The system according to the invention is provided with a position receiver (21) arranged for receiving such other vessels' (22$_1$, 22$_2$, ...) or such objects (24) positions (23N, 23E) and possible identity, whereas the chart plotter (1) according to the invention is arranged for projecting symbols (22s) for vessels or objects (22, 24) in the chart section (4). The search system according to the invention further comprises a series of features which are useful during recovery operations. A pointing unit (3), preferably mounted on deck, is arranged for directing a stabilized main axis (31) towards a target (5) in the or by the sea, and arranged for calculating the target's (5) position (5N, 5E). A second memory (82) is arranged for calculating the target's (5) position. The pointing unit (3) comprises one or more cameras (52) arranged for transmitting a camera image (45) for display in the chart plotter (1). The cameras may function in continuous or discontinuous mode according to need. An aiming circle (55) in the camera image (45) represents the stabilized main axis (31) of the camera (52). The camera (52) may be controlled in at least two ways. The chart plotter (1) is arranged for displaying a camera chart pointer symbol (56) in a position (5N, 5E) which represents the intersection of said stabilized main axis (31) with the sea or land surface. The ordinary chart plane portion of the chart plotter (1) is provided with a camera command device (57), e.g. a so-called "mouse" pointer arranged for, either directly in the screen of the chart plotter (1) or in an indirect mode, moving the camera chart pointer symbol (56) to a new desired position (53N, 53E) in the chart section (4) and thus cause the stabilized main axis (31) of the camera (52) to be steered towards the new desired position (53N, 53E). With that, the camera (52) will be rotated to display a new camera image (45) having the new desired position (53N, 53E) in the center of the image (45). In an equivalent manner camera image (45) of the chart plotter (1) is arranged for displaying an image pointer symbol for a camera image control device (59). The camera command device (57) and the camera image control device (59) may in practice be comprised in one and the same command device (57, 59) which may be part of the same pointer system or "mouse pointer". A change in the image pointer symbol position results in a rotation of the stabilized main axis (31) towards a new desired position (53N', 53E') for the main axis' intersection with the sea or land surface. In this way the operator will experience that he or she may steer the camera image (45) using symbols in the displayed image itself.

The camera image (45) in the display screen may also be provided with pointer devices arranged for commanding the camera lens' focal length (zooming) or light sensitivity, focus, frequency sensitivity, etc., or for selecting another camera, e.g. an infrared camera. An important component in the recovery system according to the invention is an identification unit (7) connected to the pointing unit (3) which is arranged for, on the basis of the camera image (45), to select the target (5) and assign a class (51) to it and thus render it an identified object (24), to store the assigned class (51) and the object's position (53N, 53E) as a stored position (58N, 58E) in said second memory (82) for display as symbols (22s) in said chart plotter (1).

The system's identification unit (7) is in an embodiment of the invention arranged for working on the basis of the camera image (45). The system may be arranged such that it allows an automatic AIS-based assigned class be suggested in a class assignment menu guide in connection with the camera image (45) at the chart plotter (1), whereafter a confirmation and choice of one of the suggested identifications that the operator sees in the image (45) and thus acceptance of the automatically suggested class, an identification will be made on the basis of the camera image (45). Other vessel's AIS signal may, due to several reasons, such as GPS-errors, unsatisfactory GPS updating frequency, etc., comprise a rather erroneous position indication. The radar may designate an erroneous or missing radar identification for other vessels. The system according to the invention may be arranged so as for having other position information about other nearby vessels near what one may see in the camera (52), such that the camera image (45) and the recovery system may furnish one or more suggestions concerning what is currently observed in the camera image (45), whereupon the operator is asked to select the most relevant class identification or select a different and more relevant class to be assigned to the object.

During recovery operations the actual point in time (58t) of making an observation may be of essential importance. e.g.

due to drift, and also due to the fact that a person may not reside for long periods of time in the sea before facing seriously negative consequences. This results in that for several situations one must prioritise the task of rescuing persons from the water before the task of rescuing persons who have managed to enter rafts or lifeboats. The recovery system according to the invention is thus provided with a clock which also assigns the point in time (58$t$) for the storage of the assigned class (51) and the stored position (58N, 58E) and stores the point in time (58$t$) with this information in said second memory (82).

In an embodiment of the invention the recovery system's identification unit (7) comprises a manual or acoustic speech recognition input unit (72). This input unit (72) may be placed in local connection with the chart plotter (1) and be arranged as a menu selection input unit (74) either arranged directly as part of the screen image, or as an interrogating system comprising acoustic speech recognition within the chart plotter (1). Such an input unit (74) may also be arranged on the deck by the pointing unit (3). The menu selection input unit (74) may thus be arranged for allowing an operator to manually select between alternative classes to be assigned, this in order for having available the most probable potential classes, and an omnibus term named "other", with the classes being predetermined so as for the user not to assign classes in an imprecise way.

The recovery system according to the invention may in an embodiment be so arranged that the identification unit (7) is provided with an automatic classification unit (76) arranged for automatically assigning a class (51) to the target (5). Such a classification may take place based e.g. on the targets (5) degree of reflection or other reflection characteristics or based on the color spectrum of said target (5). Further, the classification may take place by image recognition said image recognition being known in the background art. A class assignment of the target (5) may also take place based on radar response identification acquired using the vessel's own radar. Classification of the object (5) may furthermore take place by comparing by means of the camera's main axis' (31) position (5N, 5E) for the axis' intersection with the sea, compared to one of the received positions from said position receiver (21), and wherein the classification may take place on the basis of the identification belonging to the received positions which to a sufficient degree corresponds with the camera's aiming position (5E, 5N).

Figure 3:
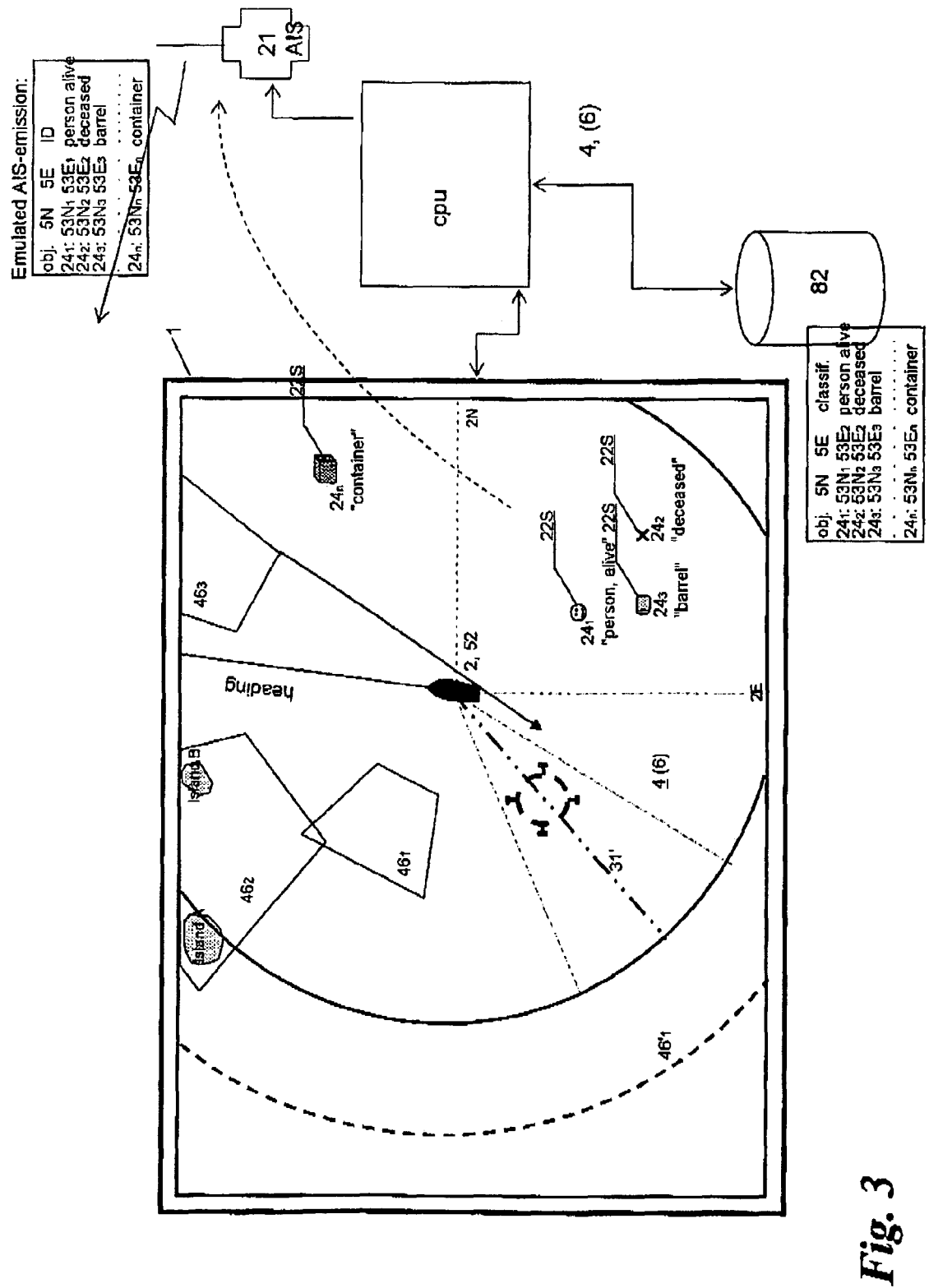
FIG. 3 illustrates that the system according to the invention retrieves information about registered objects without their own AIS transmitter from the system's memory, and emits this information as emulated AIS signals via the vessel's own AIS transmitter, so as for the registered objects apparently to emit AIS signals about their own position and assigned identification.

For items or persons unintentionally floating about in the sea, these are in most instances not provided with navigational equipment such as GPS and AIS. In an embodiment of the invention illustrated in FIG. 3 the system is arranged for collecting objects' (24) information pertaining to position and identification ($24_1$, $53N_1$, $53E_1$, $ID_1$), . . . , ($24_N$, $53N_N$, $53E_N$, $ID_N$) from the second memory (82) and sequentially broadcast information via its AIS-unit (21) as if this information pertaining to position and identification ($24_1$, $53N_1$, $53E_1$, $ID_1$), . . . , ($24_N$, $53N_N$, $53E_N$, $ID_N$) etc. belonged to each particular of said objects ($24_1$, . . . , $24_N$) etc. and if it was sent out from each particular object's AIS-transmitter, of which they are actually not in possession. Thus the system will contribute so as for the objects ($24_1$, . . . , $24_N$) to seemingly emit AIS-information about themselves via said system's own vessel's AIS (21) so as for vessels who do not have systems corresponding to the invention but only an ordinary AIS connected to an ordinary chart plotter, will be able to observe these objects ($24_1$, . . . , $24_N$) on their own chart plotters.

In an embodiment of the invention the alternative classes (51) to be assigned to the objects (24) may be selected among items in a group. Such items may comprise the following classes and their subclasses:

Vessel (ship, lifeboat, raft, floating platform, disabled ship),

Drifting items (flotsam, container, life buoy, barrels, life vests),

Pollution (oil slick, foam cover, lost cargo),

Persons (presumed alive, presumed deceased, uncertain),

Navigational mark (stake, spar buoy, light),

Land (rock awash, island, rock which covers and uncovers, mainland), or

Unknown/other.

The second memory (82) of said search system may in an embodiment be arranged for exchanging classified objects' (24) assigned class (51) and stored position (58N, 58E) with other vessels' corresponding recovery systems. This may occur via radio or optical signals, and may preferably take place automatically, but manual updating should be enabled in case an automatic updating line should fail. For those occurrences wherein a target (5), e.g. an object represented by a person ($24_1$) being in the water and having been assigned a class as "person, alive", and where this person has confirmedly been rescued and taken into a boat, either confirmed by the boat itself or via visual observation from another vessel or confirmed via radio, the recovery system according to the invention may be arranged so as for the second memory (82) to delete the record of the object, i.e. the person ($24_1$), or reassign the object's ($24_1$) assigned class (51) and stored position (58N, 58E) to "person, salvaged", as the object (24) has been handled and is not of current interest after having been rescued. While the information pertaining to the rescued object ($24_1$) is deleted or amended, this information should be communicated to other units of the recovery system on other vessels so as for as many as possibly of the participating parties with a search system are kept up to date about the development of the recovery operation. One may thus avoid vessels from trying to rescue persons who have already been rescued, or trying to find goods that has been handled by other vessels.

In an embodiment illustrated in FIG. 1 the chart plotter's (1) chart display is arranged to consecutively display a line of sight (31') representing the camera's (52) main axis' (31) projection vertically down on the surface plane. This is meant only to be a line of sight but facilitates the interpretation of what is observed in the camera image (45). There is, as an example, illustrated two islands (Island A and Island B) in the camera image (45) on either sides of the aiming circle (55) and thus the camera main axis (31), whereby one will intuitively recognize those two islands in the map when one considers their position relative to the line of sight (31') representing the camera main axis (31). In an embodiment of the invention names of geographical details being displayed in the camera (52) may be shown. Their names may be collected from manual or automatic identification in the camera image (45), or automatically by a combination of position of the camera axis and a given position from the map or the map memory. Indication of geographical names in the camera image (45) will facilitate the use of the camera image (45) in the recovery system.

An ordinary, rectangular stationary camera image with four corners usually corresponds to a trapezoid of the stationary, photographically imaged or scanned part of the sea surface, given that all four corners of the camera recording surface really image the sea surface and do not point above the horizon. Given the extent of the camera image (45) and the characteristic parameters of the lens it is easily calculated to find those of the projected trapezoid's corners that are projected on the sea surface. An embodiment of the recovery system is arranged so as for the chart section (4) to comprise one or more marked trapezoids (46) which correspond to the area portions of the sea surface that is, or have been seen or registered in the camera image (45), and arranged so as for those marked trapezoids' positions, orientations and extent to be stored and marked as searched areas in at least one of the first or second memories (8, 82), and arranged for exchanging parameters pertaining to the searched trapezoids (46) with other vessels with corresponding recovery systems, in order to avoid that the same areas of the sea surface be searched several times by different vessels. An additional improvement with respect to the stationary searched trapezoids (46) explained above is that the marked searched trapezoids (46) may be given a deviation and indicated as drifted trapezoids (46') with a deviation corresponding to the weather and the currents' calculated or observed deviation effect on drifting objects such as people, oil slicks, flotsam, lifeboats, passively drifting ships, platforms adrift, etc., in order to facilitate the selection of new relevant search areas, and to indicate with a certain probability that items that have not been found despite thorough searching in a trapezoid in its original geographical position may not be found in an area having indicated deviation from the original geographical position, so that one may direct the efforts to potentially non-searched areas. If an object (24) is recognized with certain individual identification several times with steadily changing position one is also given a basis for calculating the deviation of other objects (24) with a given position for a given point in time, so as for increasing the probability of retrieving the objects (24) at a later point in time. The recovery system according to the invention is thus arranged such that a stored position in the second memory (82) for display by symbols (24) in the chart plotter (1) is updated with regard to calculated or observed deviation due to weather and current.

The invention claimed is:

1. A marine search system comprising:
   a chart plotter for displaying a chart section from a nautical chart representation in a first memory;
   a vessel position sensor arranged for transmitting a position of a vessel to said chart plotter, said chart plotter being arranged for projecting a symbol for said position of the vessel and a heading of the vessel in said chart section;
   a position receiver arranged for receiving a position of other vessels or objects and possibly an identity of the other vessels or objects, whereby the chart plotter is arranged for projecting symbols for the other vessels or objects in said chart section;
   a pointing unit arranged for directing a stabilized main axis towards a target in a vicinity of the vessel and arranged for calculating a position of the target;
   a memory for storing said position of the target;
   said pointing unit comprising one or more cameras arranged for sending a camera image for being displayed in said chart plotter with an aiming circle representing said main axis;
   said chart plotter arranged for displaying a camera chart pointer symbol in a position which represents an intersection of said main axis with a surface and provided with a camera command device for moving said camera chart pointer symbol to a new desired position in said chart section and thus command steering of said main axis towards said new desired position;
   a camera image of said chart plotter being arranged for displaying an image pointer symbol for a camera image steering device, in which a change of a position of said image pointer symbol contributes to commanding rotation of said main axis towards a new desired position for the intersection of said main axis with the surface; and
   an identification unit connected to said pointing unit arranged for, on the basis of said camera image, to select and assign to said target a class, and further for storing said assigned class and the position of said target as an object with a stored position in a second memory for display as symbols in said chart plotter.

2. The marine search system of claim 1, wherein a point in time for the storing of said assigned class and said stored position is also stored in said second memory.

3. The marine search system of claim 1, wherein said identification unit further comprises a manual or acoustic speech recognition input unit.

4. The marine search system according to claim 1, wherein said identification unit further comprises a menu selection input unit arranged for allowing a user to manually choose between alternative potential classes.

5. The marine search system according to claim 4, wherein alternative potential classes of a target as an object are selected among items in the group consisting of:
   Vessels (including ships, lifeboats, rafts, platforms, and disabled ships),
   Navigational marks (including stakes, spar buoys, and lights),
   Drifting items (including flotsams, containers, life buoys, barrels, and life vests),
   Pollution (including oil slicks, foam covers, and lost cargo),
   Persons (including those presumably alive, presumably deceased, and uncertain),
   Land formations (including rock awash, islands, rock which covers and uncovers, and mainland), or
   Unknown/other.

6. The marine search system according to claim 1, wherein said position receiver comprises an AIS unit.

7. The marine search system according to claim 6, further arranged for retrieving information of other objects pertaining to position and identification from said second memory and for retransmitting this information via said AIS-unit, as if said position and identification were transmitted from each of said objects.

8. The marine search system according to claim 1, wherein said identification unit is provided with an automatic classification unit arranged for assigning a class to said target for said target to become an identified object, based on degree of reflection, color spectrum, image recognition, radar response identification, or position comparison with another received position of the position receiver, which to a sufficient degree corresponds with a position of the camera main axis.

9. The marine search system according to claim 8, wherein alternative potential classes of a target as an object are selected among items in the group consisting of:
   Vessels (including ships, lifeboats, rafts, platforms, and disabled ships),
   Navigational marks (including stakes, spar buoys, and lights),
   Drifting items (including flotsams, containers, life buoys, barrels, and life vests),
   Pollution (including oil slicks, foam covers, and lost cargo),
   Persons (including those presumably alive, presumably deceased, and uncertain), Land formations (including rock awash, islands, rock which covers and uncovers, and mainland), or Unknown/other.

10. The marine search system according to claim 1, wherein said second memory is arranged for exchanging an assigned class and stored position of an object with recovery systems on other vessels.

11. The marine search system according to claim 1, wherein said second memory is arranged for deleting, or reassigning an object to another assigned class and stored position, if said object is handled and thus no longer relevant after retrieval.

12. The marine search system according to claim 1, wherein said chart plotter is arranged for continuously displaying a line of sight representing a projection of the camera main axis vertically down onto the surface.

13. The marine search system of claim 1, wherein said camera command device and said camera image steering device are comprised in one and the same control device.

14. The marine search system according to claim 13, wherein said marked trapezoids are given a drift property and are marked as drifted trapezoids having a deviation corresponding to the weather and a calculated or observed deviation effect of current on drifting objects for facilitating selection of new relevant search areas.

15. The marine search system according to claim 1, wherein said chart section comprises one or more marked trapezoids which correspond to those areas of the surface which are or have been seen or registered in said camera image, and arranged such that positions, orientations, and extent of the marked trapezoids, are stored and marked as searched areas in at least one of said memories, and arranged for exchanging information pertaining to said searched trapezoids with other vessels having corresponding recovery systems.

16. The marine search system of claim 1, wherein a stored position in said second memory for being displayed by symbols in said chart plotter are updated with respect to calculated or observed drift due to weather and current.

17. The marine search system of claim 1, wherein said pointing unit is arranged for providing directional parameters for calculating a position of said target based on a position and heading and angular state (including roll, pitch, and yaw) of said vessel in the sea.

18. The marine search system of claim 1, wherein said chart plotter is arranged for projecting a radar image over said chart section.

* * * * *